United States Patent [19]

May

[11] Patent Number: 5,310,837

[45] Date of Patent: May 10, 1994

[54] LIQUID CRYSTALLINE COLORANT POLYMER

[75] Inventor: Michael May, Darmstadt, Fed. Rep. of Germany

[73] Assignee: Roehm GmbH Chemische Fabrik, Darmstadt, Fed. Rep. of Germany

[21] Appl. No.: 965,703

[22] Filed: Oct. 23, 1992

[30] Foreign Application Priority Data

Oct. 24, 1991 [DE]  Fed. Rep. of Germany ....... 4135080

[51] Int. Cl.$^5$ ....................... C08F 26/02; C08F 20/34
[52] U.S. Cl. .................... 526/245; 526/312; 526/292.2; 526/311; 526/298
[58] Field of Search ............ 526/312, 311, 298, 292.2, 526/245

[56] References Cited

U.S. PATENT DOCUMENTS 4,631,328  12/1986  Ringsdorf et al. ................. 526/259

FOREIGN PATENT DOCUMENTS

| | | |
|---|---|---|
| 0090282 | 10/1983 | European Pat. Off. . |
| 0090282 | 10/1983 | European Pat. Off. . |
| 0293870 | 12/1988 | European Pat. Off. . |
| 0410205 | 1/1991 | European Pat. Off. . |
| 3027571A1 | 2/1982 | Fed. Rep. of Germany . |
| 3211400A1 | 9/1983 | Fed. Rep. of Germany . |
| 3825066A1 | 1/1990 | Fed. Rep. of Germany . |
| 3837936A1 | 5/1990 | Fed. Rep. of Germany . |
| 61-171463 | 8/1986 | Japan . |
| 61-174463 | 8/1986 | Japan . |
| 2193338 | 2/1988 | United Kingdom . |

OTHER PUBLICATIONS

V. Percec et al. in C. B. McArdle, ed., "Side Chains Liquid Crystal Polymers", pp. 62–65.

S. Ujiie et al., (1991), Chem. Lett., 1037–1041.

M. Engel et al., (1985), Pure & Appl. Chem., 57(7):1009–1014.

H. Finkelmann et al., "Liquid Crystal Side Chain Polymers", in Adv. Polym. Sci., 60/61, 99, at 113, 145, 146.

Makromolekulare Chemie, Bd. 187, Nr. 6, 1986, Basel CH Seiten 1407–1414, K. P. Krishnat et al.. 'Synthesis of Liquid Crystalline Polyacrylates and Their Use in Capallary Gas Chromatography' *das ganze Dokument*.

Database WPIL, Week 8637, Derwent Publications Ltd., London, GB; AN 86-242376 & JP-A-61 171 463 (Shinetsu), Aug. 2, 1986, *Zusammenfassung*.

*Primary Examiner*—Joseph L. Schofer
*Assistant Examiner*—Mark Nagumo
*Attorney, Agent, or Firm*—Oblon, Spivak, McClelland, Maier & Neustadt

[57] ABSTRACT

The invention relates to liquid crystalline polymers which form exclusively nematic liquid crystalline phases. The liquid crystalline polymers are comprised of units of at least trinuclear liquid crystalline azo dye monomers M with lateral asymmetry.

8 Claims, 1 Drawing Sheet

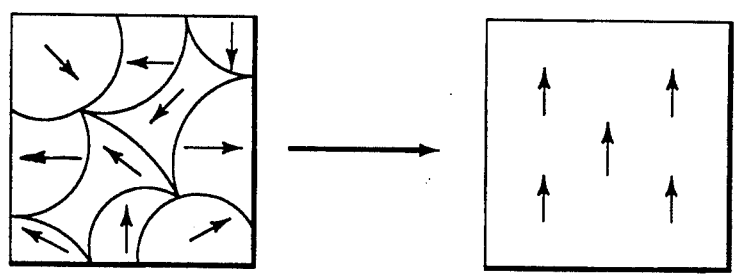
*FIG. 1A*  *FIG. 1B*

LIQUID CRYSTALLINE COLORANT POLYMER

BACKGROUND OF THE INVENTION

1. Field of the Invention

The present invention relates to a liquid crystalline (LC) colorant polymer having improved orientation properties. In particular, the present invention relates to a LC colorant polymer wherein the improved orientation properties are due to lateral asymmetry in the colorant monomers used to prepare the copolymer.

2. Discussion of the Background

Liquid crystalline colorant polymers have been known for some time (see Ger. OS 30 27 571, and Ringsdorf, H., et al., in Chapoy, L.L., "Recent advances in liquid crystalline polymers", Elsevier, p. 253 (1985)). For example, colored polymers containing at least one mesogenic group and at least one group of a pleochroic colorant connected to the polymer chain via a spacer are described in Eur. OS 0,090,282. Additional liquid crystalline colorant polymers are described in U.S. Pat. No. 4,387,745, Brit. Pat. 2,193,338, and Ger. OS 3,825,066.

Liquid crystalline polymers having colorants copolymerized or mixed therein have attracted particular interest in connection with optical data storage media. In Ger. OS 38 37 936, polymers having laterally substituted mesogenic side chains are described as useful in a variety of products, such as optical structural elements for optical memories. The proposed systems are homo- and copolymers made from monomers of laterally alkyl-substituted mesogens. As the size of the lateral substituents increases, the nematic phase of the polymer becomes more stable, and the phase transition temperature is lower. But the described systems do not contain colorants.

According to Ger. OS 32 11 400, colorant-containing copolymers can be produced by copolymerization of the above-described system with comonomers containing colorant groups, but these groups are not specified. In Jap. 61-171,463, acrylic acid derivatives are described having side chains which contain mesogens comprised of azo dyes with a lateral methyl substituent. The phase behavior of the monomers and polymers is described briefly, and the product is proposed to be useful as a stationary material for gas chromatography. No additional physical properties are described.

The use of liquid crystalline colorant polymers for reversible optical data storage requires high sensitivity of the colorant molecule, short write and erase times, good long term stability, and a uniform macroscopic orientation of the colorant molecules in the storage medium.

Because the conventionally used azo dyes either have a smectic phase or are not mesogenic, copolymerizing these dyes with LC monomers provides a system which either displays smectic behavior at relatively high dye concentrations and low temperatures or has a strongly destabilized LC phase. In general, this severely limits the usable colorant concentrations. Since the smectic phase generally represents the low temperature phase having relatively high viscosity over a wide temperature interval, pre-orientation of the polymer samples in the low viscosity nematic phase must occur at relatively high temperatures in a generally narrow temperature interval. When the sample is cooled into the glass state, there is a transition through the smectic region resulting in substantial thermal stress on the polymer, and usually leading to appreciably inferior macroscopic orientation. The wider the temperature range of this phase, the more substantially the already achieved macroscopic orientation is reduced by reorientation phenomena.

SUMMARY OF THE INVENTION

Accordingly, one object of the present invention is to provide a colorant polymer having a sufficiently stable nematic LC-phase.

A further object of the present invention is to provide a colorant polymer having exclusively a nematic LC-phase with no smectic phase.

Another object of the present invention is to provide a liquid crystalline colorant polymer having lateral asymmetry.

Still another object of the present invention is to provide a liquid crystaline colorant polymer in which the lateral asymmetry is achieved by the use of LC azo dye monomers of at least trinuclear structure which have one or more lateral substituents.

These and other objects of the present invention have been satisfied by the discovery of a liquid crystalline polymer which forms exclusively a nematic liquid crystalline phase comprising repeat units derived from one or more liquid crystalline azo dye monomers M having lateral asymmetry.

DETAILED DESCRIPTION OF THE PREFERRED EMBODIMENTS

The present invention relates to a liquid crystalline polymer which forms exclusively a nematic liquid crystalline phase comprising repeat units derived from one or more liquid crystalline azo dye monomers M having lateral asymmetry. As a result of the lower viscosity of the nematic LC-phase when compared to the smectic LC-phase, the liquid crystalline colorant polymer of the present invention has improved macroscopic orientability on suitably pretreated surface-coated glass plates. This is particularly true when the polymer has a substantially higher viscosity than the monomer M used to prepare the polymer.

Preferred monomers for use as the azo dye monomer, M, of the present invention are monomers of formula I:

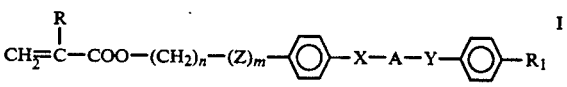

where
- R represents hydrogen or methyl;
- $R_1$ represents an alkyl group with 1-8 C atoms or a halogen substituent, preferably fluorine, chlorine, or bromine; or an alkoxy group with 1-8 C atoms; a nitrile group or a nitro group;
- X represents a —COO— or —N=N—group;
- Y represents a —COO— or —N=N—group;
- n represents an integer from 1 to 11;
- m is zero or 1;
- Z represents oxygen; and
- A represents an aromatic group having lateral asymmetry; with the provision that X and Y are each different or are both —N=N—groups (in monomer M-1).

Preferably A represents a group

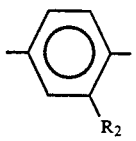

where
R₂ represents an alkyl group having 1–11 C atoms, preferably 1–2 C atoms, which may be functionalized with a polymerizable double bond, or halogen, preferably fluorine, chlorine, or bromine,
or A represents a group

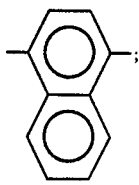

and n preferably represents 1.

The principle of lateral substitution was first used by Weissflog and Demus to prepare monotropic nematic systems from trinuclear low molecular weight liquid crystals.

This principle was then applied to LC-polymers by Hessel and Finkelmann, wherewith the nematic phases showed enantiotropy providing a stabilizing effect. However, the cited systems did not involve colorants.

In one embodiment of the present invention the desired polymer phase behavior is obtained by altering the molecular symmetry of the mesogen with "disturbing moieties" such that the formation of smectic phases is blocked but the molecule retains sufficient mesogenic character to form nematic phases.

Suitable "disturbing moieties" for suppressing smectic phase behavior include alkyl substituents having 1–11 C atoms, preferably 1–2 C atoms, and halogen substituents, preferably fluorine, chlorine, or bromine substituents, more preferably chlorine substituents. Particularly suitable positions for the "disturbing moieties" include the 2- or 3-position (with respect to the azo group) on the middle aromatic ring of the mesogenic trinuclear azo dye monomer. The symmetry of the mesogen can optionally be disturbed by the incorporation of a naphthyl or anthracenyl group as the middle part of the mesogen.

Monomer M-1 can be manufactured by any conventional method. For example, when the starting materials are the phenolic compound of formula II

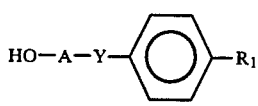

where Y, A, and R are as defined above, and the benzoic acid derivative of formula III

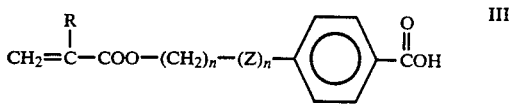

where R, Z, m, and n are as defined above, II and III are condensed to form the compound of formula I, using a condensation agent in the presence of an inert base in an inert medium. Suitable inert media include halogenated hydrocarbons such as chloroform and dichloromethane. Suitable condensation agents include carbodiimides such as dicyclohexyl carbodiimide (DCC). Suitable inert bases include amines such as dimethylaminopyridine and triethylamine.

The compound of formula II where Y represents —N=N— is prepared by any conventional method, such as by diazotization of compounds of formula IV

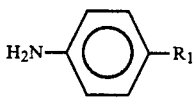

where R₁ is as defined above, using a phenol H—A—OH, where A is as defined above.

The compounds of formula III are also prepared by any conventional method, such as by reacting an omega-hydroxyalkyl halide of formula V $$HO-(CH_2)_n-Hal \qquad V$$

wherein
n is as defined above, and
Hal represents a halogen such as chlorine, bromine, or iodine,
with 4-hydroxybenzoic acid by a method similar to the Williamson ether synthesis (see Houben-Weyl, 1965, "Methoden der organische Chemie", 4th Ed., V. 6/3, pub. Georg-Thieme-Verlag, p. 24), followed by azeotropic esterification with (meth)acrylic acid.

Alternatively, in the case where m=1, a phenolic compound of formula VI, for example,

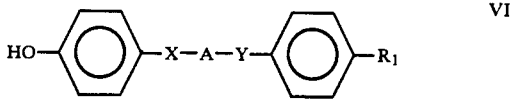

where X, Y, A, and R₁ are as defined above, may be subjected to an ether condensation similar to the above-mentioned Williamson ether synthesis, with an omega-hydroxyalkyl halide of formula V $$HO-(CH_2)n-Hal \qquad V$$

to give a compound of formula III

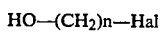

where X, Y, A, R₁, and n are as defined above. This in turn is reacted with acrylic acid or methacrylic acid or suitable derivatives, to yield the compound I.

In addition to units of one or more monomers M, the polymers of the present invention optionally contain, as mesogenic groups, from 0-99 wt.%, preferably 5-80 wt.%, of comonomers CO-M, such as esters of (meth)acrylic acid, which are different from M-I and have an alkyl group with 2-11 C atoms as a spacer. Such mesogenic groups are disclosed in Demus, D., and Zaschke, H., "Fluessigkristalle in Tabellen", Vols. 1 and 2, VEB Deutscher Verlag fuer Grundstoffenergie, of Leipzig (E. Germany, 1984). Examples of these mesogenic groups include nematogenic esters of 4-hydroxybenzoic acid, particularly the biphenyl ester of 4-hydroxybenzoic acid with two methylene groups as a spacer.

The liquid crystalline polymer of the present invention is prepared by polymerizing one or more monomers M of the formula I using conventional polymerization methods, such as radical polymerization.

The polymerization is carried out in the melt or by the emulsion or suspension method (see Rauch-Puntigam, H., and Voelker, Th., "Acryl- und Methacryl-verbindungen", pub. Springer-Verlag, Berlin (1967)).

Radical polymerization is carried out at temperatures above room temperature, preferably in the range of from 40°-70° C., using conventional radical initiators such as peroxy-compounds or azo compounds. The radical initiators are used in an amount of from 0.001-1.0 wt.% based on the total weight of the monomers. Suitable radical initiators include dibenzoyl peroxide, dilauroyl peroxide, di-tert-butyl peroxide, and azoisobutyronitrile (see Rauch-Puntigam and Voelker).

In addition, conventional molecular weight regulators such as disulfides and thiols may be used, in conventional amounts of from 0.05-2 wt.% (based on the total weight of the monomers). The resulting polymer of the present invention has a molecular weight Mw in the range of from 10,000-1,000,000, preferably from 20,000-50,000 Dalton. (Determined according to the method of Mark, et al., "Encyclopedia of polymer science and technology", 2nd Ed., V. 10, J. Wiley (1987).)

ADVANTAGEOUS CHARACTERISTICS

The polymers of the present invention provide liquid crystalline colorant polymers which are capable of better macroscopic orientation at lower temperatures than previously possible, as a result of the low viscosity of the nematic phase. Further, these systems are not limited in the colorant concentration used.

FIGS. 1A and B illustrate the formation of macroscopic LC monodomains. When an LC polymer is applied to a suitable support preferably in a thin layer of approximately 1 micron thickness, a structure forms with statistical distribution of the preferred directions of the individual domains (State A). Here the arrows represent the directors. In order to use a polymer as an optical data memory for phase modulation by linearly polarized light, it is necessary to have an initial state with a defined, uniform director orientation (State B). This orientation can be achieved by a variety of means, such as the use of suitably pretreated surfaces. The polymer of the present invention comprised of units of monomers of formula I, which must display nematic behavior, allows one to readily obtain these necessary states. The described uniform director orientation is achieved by cooling the polymer below its clear temperature. The quality of the orientation is measured in a polarization microscope by measuring the light intensities parallel to the preferred direction (dark position) and at an angle of 45° thereto (light position). The numerical values of the resulting degree of orientation effect vary between 0 and 100%.

A polyimide (PI)-coated glass substrate, for example, can serve as the support.

Having generally described this invention, a further understanding can be gained by reference to certain specific examples, which are described below for illustrative purposes only and are not intended to be limiting unless otherwise specified.

EXAMPLES

Preparation of the monomer M:

M-I. 4-(4-(methacryloyloxyhexamethyleneoxy)-benzoyloxy)4'-ethoxy-2-ethyl-azobenzene:

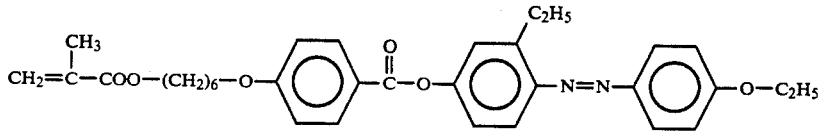

30.6 g (0.1 mol) of 4-(4-(Methacryloyloxyhexamethyleneoxy)benzoic acid, 24.4 g (0.1 mol) of 4-hydroxy-4'-ethoxy-2-ethylazobenzene, 0.6 g (5 mmol) of dimethylaminopyridine, and 150 ml of dichloromethane were charged to a round bottomed flask. A solution of 26.8 g (0.13 mol) DCC in 50 ml of dichloromethane was added to this suspension. The slightly exothermic reaction was held to a maximum of 30° C. by means of an ice bath. After about 1 hr, the cooling was removed and the reaction mixture was stirred an additional 4 hr at room temperature. The reaction mixture was cooled with dry ice to about 0° C., at which point the dicyclohexylurea produced precipitated and could be removed by suction filtration. The filtrate was concentrated at room temperature, and the residue was taken up in 200 ml of dichloromethane, filtered, and concentrated. The raw product was recrystallized from 70 ml of acetic acid / isopropanol mixture (3:5). The resulting solid was separated by suction filtration, washed with hexane, and dried under vacuum at room temperature. The result was 38.9 g product (71.4% of theoretical yield).

Preparation of compounds of formula II

II-I. 4'-ethoxy-2-ethyl-4-hydroxyazobenzene 0.8 mol (109.8 g) of p-phenetidine and 2.1 mol (450 ml) of 16% hydrochloric acid were charged to a round bottomed flask. With cooling of the suspension to about 3° C., 59.2 g (0.8 mol) of NaNO$_2$ dissolved in 320 ml of water was added dropwise over 2.5 hr. During this process the temperature was maintained between 1° and 4° C. After completion of the addition, the mixture was stirred for another 3 hr at 0°-3° C., and was allowed to stand overnight in a refrigerator. A solution of 0.8 mol (97.7 g) of 3-ethylphenol in 800 ml of 2N sodium hydroxide cooled to 5° C. was added dropwise to this suspension at 2° C., over a period of 2 hr, under stirring. An orange-yellow suspension resulted. The reaction mixture was allowed to warm up to room temperature, and was stirred an additional 1 hr. The raw product was then separated by suction filtration and was washed with cold, distilled water. The filter cake was boiled with 2 L of 50:50 ethanol/water mixture, followed by filtration. The resulting 2-phase mixture was allowed to cool under stirring. A brown-red solid precipitated, which was separated by suction filtration, followed by neutral washing. After drying, the product was obtained in a yield of 61% of theoretical.

Preparation of a monomer CO-M

I-2. 4-Methacryloyloxyethyloxybenzoic acid, 4-biphenyl ester:

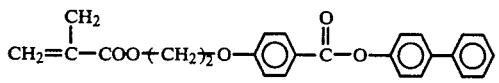

42.55 g of 4-hydroxybiphenyl, 3.66 g of dimethylaminopyridine, and 30.18 g of triethylamine were dissolved in 200 ml of 1,4-dioxane under stirring, in a round bottomed flask. 67.17 g of 4-methacryloyloxyethyloxy-benzoyl chloride dissolved in 200 ml of 1,4-dioxane was added dropwise. The reaction was exothermic (the temperature increased to about 49° C.). The reaction mixture was stirred at room temperature overnight, then concentrated on a rotary evaporator, and the residue was added to 1L of fully desalinated water, followed by fourfold extraction with 200 ml portions of distilled dichloromethane. The recombined organic phases were concentrated on a rotary evaporator, and the residue was recrystallized from ethanol.

Preparation of 4-Methacryloyloxyethyloxybenzoyl chloride 62.56 g of 4-methacryloyloxyethyloxybenzoic acid was charged to a flask with 0.5 g dimethyl formamide , and 54.38 ml of thionyl chloride was added dropwise under stirring. The reaction was exothermic. The reaction mixture was stirred overnight to give a clear brownish solution. The excess thionyl chloride was drawn off under vacuum. The residue was digested once with 20 ml of distilled toluene, and the toluene drawn off under vacuum. The residue was directly usable.

Table 1 indicates specific successfully employed comonomers M and CO-M.

Preparation of the copolymer 2.09 g (5.2 mmol) of the comonomer CO-M and 2.91 g of the monomer M-1 were dissolved in 15 ml of 1,4-dioxane, and 0.03 g (0.2 mmol) of methyl 3-mercaptopropanoate was added as a regulator. The solution was saturated with argon for 5 min. 2,2'-azobis(isobutyronitrile) and 2,2'-azobis(2,5-dimethylvaleronitrile) were then added, each in the amount of 1 mol%. The polymerization vessel was sealed, and polymerization was carried out for 24 hr at 70° C. The resulting polymer was precipitated in 400 ml methanol (AP), followed by suction filtration. For purification, the reprecipitation was repeated 4 times.

Table 2 provides data regarding the polymers of the present invention and their relevant properties. The degree of orientation effect (OWG) was determined with a polarization microscope by measuring the light intensity parallel (dark position) to the preferred direction and at a angle of 45° C. (light position) to the preferred direction:

$$OWG = \frac{I(45°) - I(0°)}{I(45°)}$$

TABLE 1

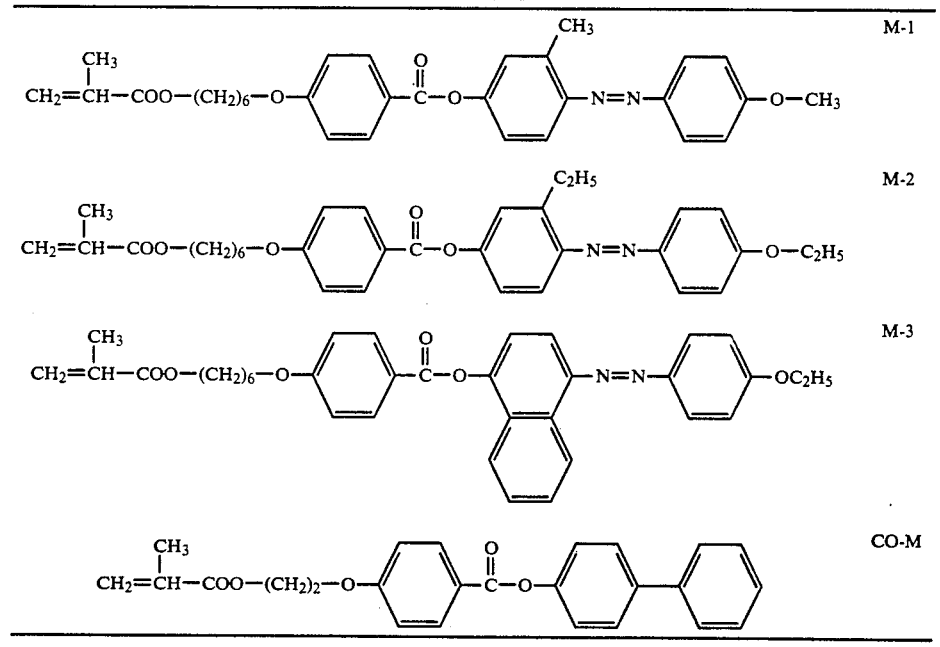

TABLE 2

| | Characteristics of the polymers (Compositions are in weight percent) | | | | | |
|---|---|---|---|---|---|---|
| CO-M | M-1 | M-2 | M-3 | $T_g$ | $T_{n,i}$ | OWG |
| 100 | — | — | — | 76° | 173° | — |
| 90 | 10 | — | — | 98° | 183° | 86° |
| 80 | 20 | — | — | 94° | 184° | 89° |
| 30 | 70 | — | — | 52° | 185° | 91° |
| — | 100 | — | — | 54° | 223° | — |
| 90 | — | 10 | — | 104° | 175° | 95° |

TABLE 2-continued

Characteristics of the polymers
(Compositions are in weight percent)

| CO-M | M-1 | M-2 | M-3 | $T_g$ | $T_{n,i}$ | OWG |
|------|-----|-----|-----|-------|-----------|-----|
| 80 | — | 20 | — | 90° | 171° | 94° |
| 30 | — | 70 | — | 80° | 172° | 90° |
| — | — | 100 | — | 32° | 170° | 94° |
| 90 | — | — | 10 | 99° | 175° | 91° |
| 80 | — | — | 20 | 94° | 176° | 95° |
| 70 | — | — | 30 | 92° | 175° | 95° |
| 60 | — | — | 40 | 92° | 173° | 95° |
| 50 | — | — | 50 | 87° | 173° | 97° |
| 40 | — | — | 60 | 87° | 178° | 99° |
| 30 | — | — | 70 | 74° | 176° | 96° |
| 20 | — | — | 80 | 73° | 165° | 97° |
| 10 | — | — | 90 | 70° | 186° | 97° |
| — | — | — | 100 | 72° | 184° | 85° |

Key to Table 2:
$T_g$ = glass transition temperature;
$T_{ni}$ = clear transition temperature (Nematic-isotropic);
OWG = degree of orientation effect.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A liquid crystalline polymer which forms exclusively a nematic liquid crystalline phase comprising repeating units derived from one or more liquid crystalline azo dye monomers M having formula I:

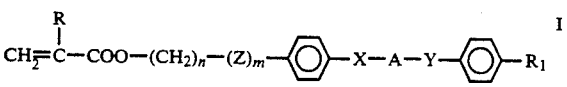

wherein R is hydrogen or methyl; $R_1$ is an alkyl group of 1 to 8 carbon atoms, or a halogen substituent; X is a —COO— or —N=N—group; Y is a —COO— or —N=N—group; n is an integer from 6 to 11; m is 0 or 1; Z is oxygen; and A is an aromatic group having lateral asymmetry; with the provision that X and Y are each different or both are azo groups, wherein said polymer comprises units derived from said monomer M in an amount of from 5 to 100%.

2. A liquid crystalline polymer as claimed in claim 1, further comprising mesogenic groups derived from a comonomer CO—M, different from said monomer M.

3. A liquid crystalline polymer as claimed in claim 2, wherein said comonomer CO—M is an ester of acrylic acid or methacrylic acid, and contains an alkylene group of from 2 to 11 C atoms as a spacer.

4. A liquid crystalline polymer as claimed in claim 2, wherein the polymer contains comonomer CO—M which provides for 0-99 wt.% of mesogenic groups.

5. A liquid crystalline polymer as claimed in claim 1, wherein said polymer has a weight average molecular weight of from 10,000 to 1,000,000 Dalton.

6. A liquid crystalline polymer as claimed in claim 1, wherein A represents a group

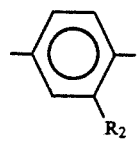

where
$R_2$ represents halogen or an alkyl group having 1-11 C atoms, which may be functionalized with a polymerizable double bond,
or A represents the group

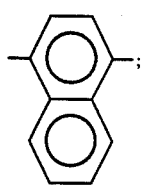

and n is 1.

7. A liquid crystalline polymer as claimed in claim 1, wherein $R_2$ represents fluorine, chlorine, bromine, or an alkyl group of from 1-2 C atoms.

8. A liquid crystalline polymer which forms exclusively a nematic liquid crystalline phase comprising repeating units derived from one or more liquid crystalline azo dye monomers M having formula I:

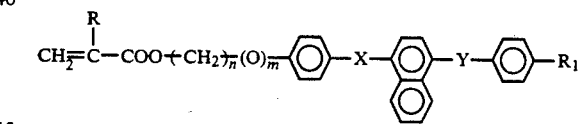

wherein R is hydrogen or methyl; $R_1$ is an alkyl group of 1 to 8 carbon atoms, or a halogen substituent; X is a —COO— or —N=N—group; Y is a —COO— or —N=N—group; n is an integer from 1 to 11; and m is 0 or 1; wit the provision that X and Y are each different or are both —N=N—groups, wherein said polymer comprises units derived from said monomer M in an amount of from 5 to 100 wt.%.

* * * * *